(12) United States Patent
Uysal et al.

(10) Patent No.: US 11,311,845 B2
(45) Date of Patent: Apr. 26, 2022

(54) MIXER

(71) Applicant: Eberspächer Exhaust Technology GmbH, Neunkirchen (DE)

(72) Inventors: Fatih Uysal, Plochingen (DE); Enver Kurpejovic, Kirchheim unter Teck (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/036,686

(22) Filed: Sep. 29, 2020

(65) Prior Publication Data

US 2021/0113973 A1 Apr. 22, 2021

(30) Foreign Application Priority Data

Oct. 22, 2019 (DE) .................... 10 2019 128 504.6
Nov. 11, 2019 (DE) .................... 10 2019 130 305.2

(51) Int. Cl.

| B01F 5/04 | (2006.01) |
|---|---|
| B01F 3/04 | (2006.01) |
| B01D 53/94 | (2006.01) |
| F01N 3/20 | (2006.01) |
| F01N 13/00 | (2010.01) |
| F01N 3/28 | (2006.01) |
| B01F 5/00 | (2006.01) |

(52) U.S. Cl.
CPC ........ B01F 5/0451 (2013.01); B01D 53/9418 (2013.01); B01F 3/04021 (2013.01); F01N 3/2066 (2013.01); F01N 3/2892 (2013.01); F01N 13/008 (2013.01); B01F 2005/0017 (2013.01); F01N 2610/1453 (2013.01)

(58) Field of Classification Search
CPC .............. B01F 5/04151; B01F 3/04021; B01F 5/06048; B01F 5/064; F01N 3/2892; F01N 2610/1453
USPC ........................................................ 422/176
See application file for complete search history.

(56) References Cited

U.S. PATENT DOCUMENTS

| 10,047,657 | B2 | 8/2018 | Noren, IV et al. |
| 10,190,463 | B2 | 1/2019 | Kurpejovic et al. |
| 10,480,372 | B2 | 11/2019 | Inclan et al. |
| 2008/0041036 | A1* | 2/2008 | Witte-Meri ........... F01N 3/2066 60/282 |
| 2009/0313979 | A1 | 12/2009 | Kowada |

(Continued)

FOREIGN PATENT DOCUMENTS

| CN | 104040130 A | 9/2014 |
| CN | 105705742 A | 6/2016 |

(Continued)

*Primary Examiner* — Tom P Duong
(74) *Attorney, Agent, or Firm* — McGlew and Tuttle, P.C.

(57) ABSTRACT

A mixer for an exhaust system of an internal combustion engine includes a mixer housing (40) with an inflow opening central axis (LE) and with an outflow opening (38). A first flow duct (48) following the inflow opening (24) in the mixer housing (40) and a second flow duct (50) lead parallel to one another to a third flow duct (54) and open into same. The third flow duct (54) leads to the outflow opening (38). The first flow duct (48) and the second flow duct (50) are provided between an outer wall (16) of the mixer housing (40) and a flow divider wall (36) enclosed by the outer wall (16), and the third flow duct (54) is enclosed by the flow divider wall (36).

16 Claims, 3 Drawing Sheets

(56) References Cited

U.S. PATENT DOCUMENTS

| | | | | |
|---|---|---|---|---|
| 2010/0199645 A1* | 8/2010 | Telford | ............... | F01N 13/009 60/295 |
| 2014/0311133 A1* | 10/2014 | Norling | ............... | B01F 15/066 60/286 |
| 2014/0334988 A1* | 11/2014 | Stanavich | ............ | F01N 3/2892 422/177 |
| 2016/0184783 A1* | 6/2016 | Tyni | ..................... | B01F 5/0602 422/169 |

FOREIGN PATENT DOCUMENTS

| | | | |
|---|---|---|---|
| CN | 107407183 | A | 11/2017 |
| DE | 102015103303 | B3 | 9/2016 |
| DE | 102015108655 | A1 | 12/2016 |
| DE | 102017105093 | A1 | 9/2017 |
| EP | 2128398 | A1 | 12/2009 |
| EP | 3015669 | A1 | 5/2016 |
| EP | 3216992 | A1 | 9/2017 |
| EP | 3265656 | A1 | 1/2018 |
| EP | 3265656 | B1 | 2/2020 |

\* cited by examiner

MIXER

CROSS REFERENCE TO RELATED APPLICATIONS

This application claims the benefit of priority under 35 U.S.C. § 119 of German Applications 10 2019 128 504.6, filed Oct. 22, 2019 and 10 2019 130 305.2, filed Nov. 11, 2019, the entire contents of which are incorporated herein by reference.

TECHNICAL FIELD

The present invention pertains to a mixer for an exhaust system of an internal combustion engine.

TECHNICAL BACKGROUND

To reduce the nitrogen oxide content in the exhaust gas discharged by a diesel internal combustion engine, it is known that a reactant, for example, a urea/water solution, is injected into the exhaust gas stream and is mixed thoroughly with the exhaust gas stream. A catalytic reaction leading to the reduction of the nitrogen oxide content is then carried out in an SCR catalytic converter that follows further downstream.

For an efficient carrying out of this catalytic reaction, it is necessary that an intensive mixing of the reactant injected into the exhaust gas with the exhaust gas be brought about upstream in relation to the SCR catalytic converter. Mixers, which can bring about a swirling, possibly also an evaporation of the reactant, by means of different flow-related actions, are used for this purpose

SUMMARY

An object of the present invention is to provide a mixer for an exhaust system, which mixer ensures a good mixing of exhaust gas and reactant injected into this exhaust system with a structurally simple configuration. According to the present invention, this object is accomplished by a mixer for an exhaust system of an internal combustion engine, comprising a mixer housing with an inflow opening and with an outflow opening, wherein a first flow duct following the inflow opening in the mixer housing and a second flow duct lead parallel to one another to a third flow duct and open into same, wherein the third flow duct leads to the outflow opening, wherein the first flow duct and the second flow duct are provided between an outer wall of the mixer housing and a flow divider wall enclosed by the outer wall, and the third flow duct is enclosed by the flow divider wall.

In case of a mixer configured according to the present invention, the exhaust gas stream discharged by an internal combustion engine, for example, by a diesel internal combustion engine is divided into two partial streams during or after introduction into the mixer via the inflow opening. The two partial streams flow separated from one another in the first flow duct or the second flow duct and are merged again when introduced into the third flow duct. A swirling, which brings about efficient mixing of exhaust gas and reactant, is generated during this merging.

It should be pointed out that the term "parallel" expresses that in the sense of the present invention the two partial streams flowing in the first or second flow duct are guided parallel to one another in terms of flow, but basically separated from one another, but are not necessarily guided geometrically parallel to one another.

In order to be able to provide a course supporting the formation of a swirling for the two flow ducts at the area of the merging of same, it is proposed that the mixer housing defines outwardly the first flow duct with a first bulge area of the outer wall and it defines outwardly the second flow duct with a second bulge area of the outer wall.

Introduction of the two merged partial streams that is directed and further supports the formation of a swirling can be achieved by the first bulge area and the second bulge area adjoining one another in the area of an indentation area, wherein the indentation area forms a flow deflection area deflecting the exhaust gas streams from the first flow duct and from the second flow duct into the third flow duct.

For the entry of the two partial streams, which are merged again in the area of the third flow duct, into the third flow duct, the first flow duct and the second flow duct open into the third flow duct in the area of a flow opening in the flow divider wall.

In this connection, it is especially advantageous for the formation of a turbulent flow when the flow opening is located opposite the indentation area.

For a configuration that can be embodied in a structurally simple manner, provisions may be made for the outer wall to be formed by a first housing element, wherein the inflow opening is formed at the first housing element, and for the flow divider wall to be formed by a second housing element which is at least partially inserted into the first housing element, wherein the outflow opening is formed at the second housing element.

A simple configuration can further be supported by the second housing element being elongated in the direction of an outflow opening central axis of the outflow opening, wherein the second housing element forms the outflow opening in a tubular first length area and is connected to the first mixer housing element and forms the flow divider wall in a second length area.

In order to be able to support the evaporation of the reactant by means of the flow divider wall, it is proposed that the second housing element form a reactant receiving surface area with an apex area of the flow divider wall, which apex area faces the inflow opening. Due to the injection of the reactant onto the flow divider wall, a large-area wetting of the flow divider wall and thus efficient reactant evaporation are supported.

In order to force a further flow deflection during flow between the inflow opening and the outflow opening in addition to the swirling generated according to the present invention, it is proposed that an inflow opening central axis of the inflow opening and an outflow opening central axis of the outflow opening be arranged not parallel to one another and not coaxially to one another. In particular, provisions may be made in this case for the inflow opening central axis and the outflow opening central axis to intersect each other and/or to be arranged at an angle in the range of 80° to 100°, preferably about 90°, to one another.

In case of a configuration that is advantageous for efficient mixing and introduces a relatively low flow resistance, the first flow duct and the second flow duct have an essentially mirror-symmetrical configuration in relation to a central plane spanned by an inflow opening central axis of the inflow opening and an outflow opening central axis of the outflow opening.

This can be embodied, for example, by the first mixer housing element and the second housing element having an essentially mirror-symmetrical configuration in relation to the central plane spanned by the inflow opening central axis and the outflow opening central axis.

For example, the outer wall provides a heart-shaped circumferential contour of the mixer housing with the first bulge area, with the second bulge area and with the indentation area.

For a structural linking of the mixer configured according to the present invention with an injector intended for injecting the reactant, it is proposed that an injector mounting formation be provided in the area of the inflow opening. Further, a sensor mounting formation may be provided in the area of the inflow opening for the determination of information relevant for the operation of an exhaust system, for example, the exhaust gas temperature, the oxygen content in the exhaust gas or the nitrogen oxide content in the exhaust gas.

In order to improve the interaction of the mixer with the exhaust gas flowing through same or with the reactant injected into the exhaust gas stream, it is proposed that at least one surface-enlarging element protruding in front of or into the first flow duct or/and at least one surface-enlarging element protruding in front of or into the second flow duct be provided at the flow divider wall. A plurality of such surface-enlarging elements, which are arranged following one another, for example, in the flow direction in the respective flow duct or/and upstream thereof are preferably provided in association with at least one of the two flow ducts. These surface-enlarging elements reinforce the swirling of the exhaust gas stream, on the one hand, and, on the other hand, provide an enlarged surface of the flow divider wall, which the reactant injected in liquid form can impinge, in order to then be evaporated from this surface.

As an alternative or in addition, the flow divider wall may have a wave-shaped configuration in at least some areas for enlarging the surface or even for the reinforced generation of a swirling of the exhaust gas stream.

The present invention further pertains to an exhaust system for an internal combustion engine, comprising a mixer configured according to the present invention, as well as an injector carried at the mixer housing or upstream of the mixer housing.

For an efficient evaporation of the injected reactant, it is proposed that the injector be carried at the mixer housing or upstream of the mixer housing such that a reactant stream released by this injector is directed toward a reactant-receiving surface area of the flow divider wall.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
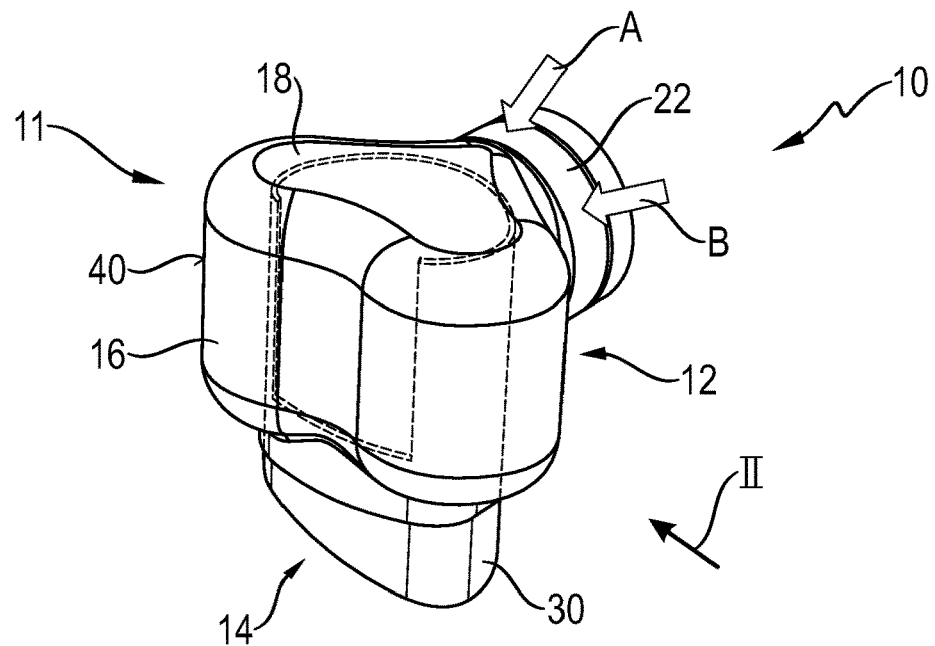
FIG. 1 is a perspective view of a mixer for an exhaust system of an internal combustion engine.

Referring to the drawings, A mixer for an exhaust system of an internal combustion engine, which exhaust system is generally designated by 11, is designated by 10 in the figures. The mixer 10 comprises a housing-like first housing element 12 and a tubular second housing element 14. Each of the two housing elements is preferably made of sheet metal material.

The first housing element 12 is configured with an outer wall 16 configured as a circumferential wall, with an upper end wall 18 adjoining the outer wall 16, and with a lower end wall 20 adjoining the outer wall 16 at the other end. For example, the outer wall 16 and the two end walls 18, 20 can be formed by components, which are each provided separately as shaped sheet metal parts and connected to one another by welding. An inflow pipe 22 may be connected, for example, by welding to the outer wall 16 or to the two end walls 18, 20 and may, for example, together with these end walls 18, 20 form an inflow opening 24. This inflow opening 24 leads through the inflow element 22 along an inflow opening longitudinal axis LE into an interior space 26 formed in the first housing element 14.

Figure 4:
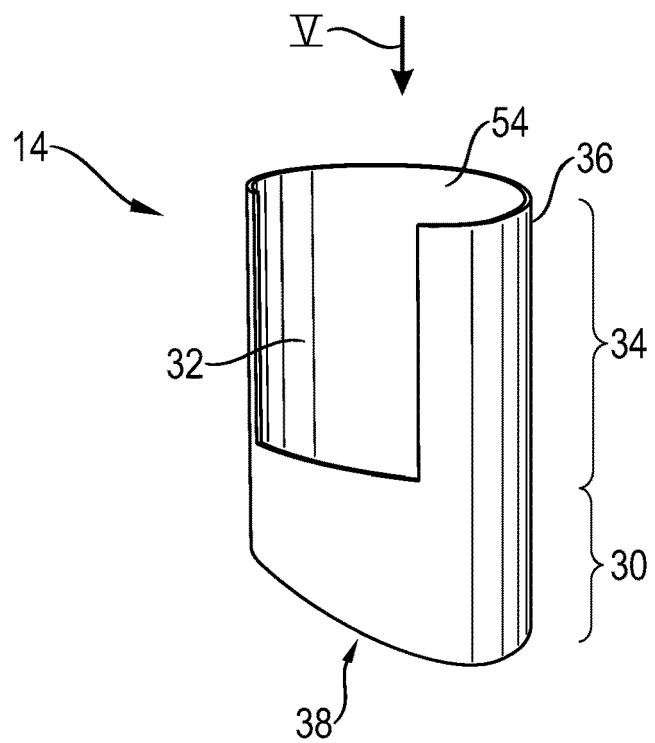
FIG. 4 is a perspective view showing a housing element of the mixer according to FIG. 1, which housing element forms a flow divider wall and an outflow opening.

For example, an essentially cylindrical attachment 28, through which the second housing element 14 is inserted into the first housing element 12 and to which the second housing element 14 may be fixed, for example, by welding, may be provided at the lower end wall 20. As can be seen in FIG. 4, the second housing element 14 is configured with an essentially tubular first length area 30 and with a second length area 34 adjoining it and providing a flow opening 32. The second housing element 14 forms a flow divider wall 36 with the second length area 34 essentially extending in the interior space 26. In the area of the first length area 30, the second housing element 14 provides an outflow opening 38, through which the mixture of reactant and exhaust gas leaving the mixer 10 in the direction of an outlet opening central axis LA can flow to a system area of an exhaust system, for example, an SCR catalytic converter, which system area then follows in the flow direction.

Figure 2:
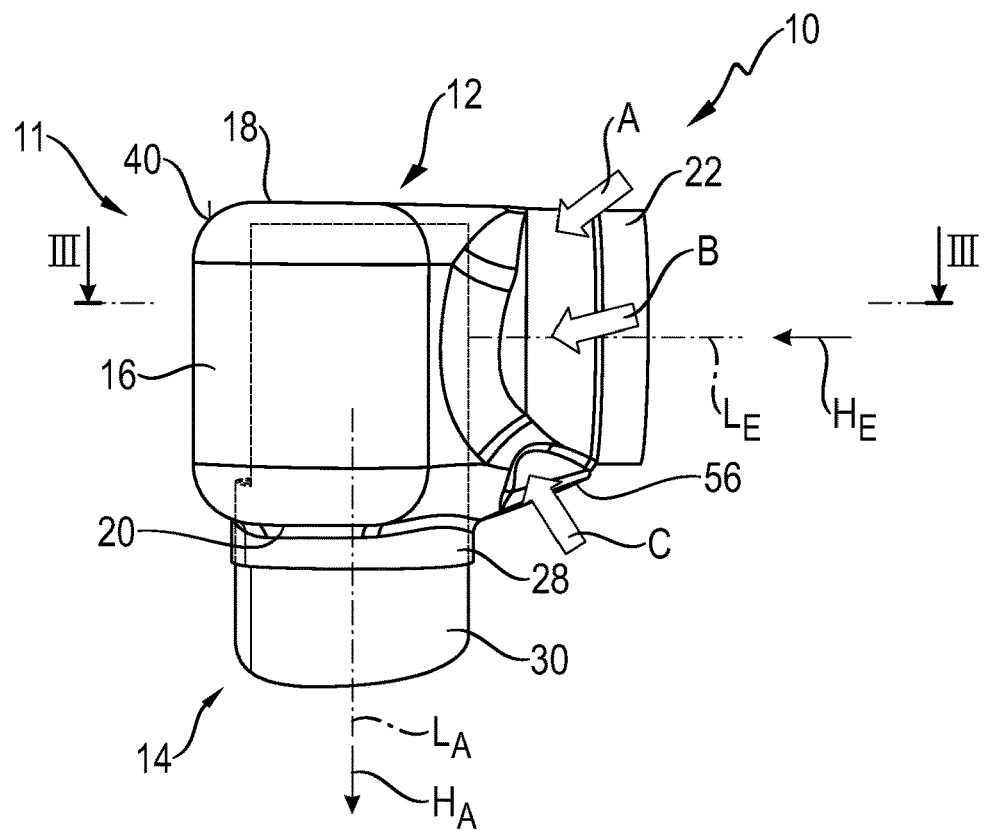
FIG. 2 is a side view of the mixer in viewing direction II in FIG. 1.

In the mixer housing 40 formed essentially by the two housing elements 12, 14, the inflow opening 24 and the outflow opening 38 are arranged and oriented such that the respective central axes LE and LA thereof lie in a common plane E or span this plane E and are not parallel or coaxial to one another. As FIG. 2 illustrates this, the two central axes LE and LA can be arranged, for example, at an angle of approximately 90°, i.e., at right angles to one another.

If the inflow opening 24 and the outflow opening 38 are provided in the area of cylindrical sections of the mixer housing 40, the inflow opening central axis LE and the outflow opening central axis LA may correspond, for example, essentially to the cylindrical axes of these sections. If the inflow opening 24 and the outflow opening 38 are not provided in the area of cylindrical sections of the mixer housing 40, the inflow opening central axis LE and the outflow opening central axis LA can be considered approximately to be central lines, which represent the geometric central area of these openings, but do not necessarily extend linearly.

Figure 3:
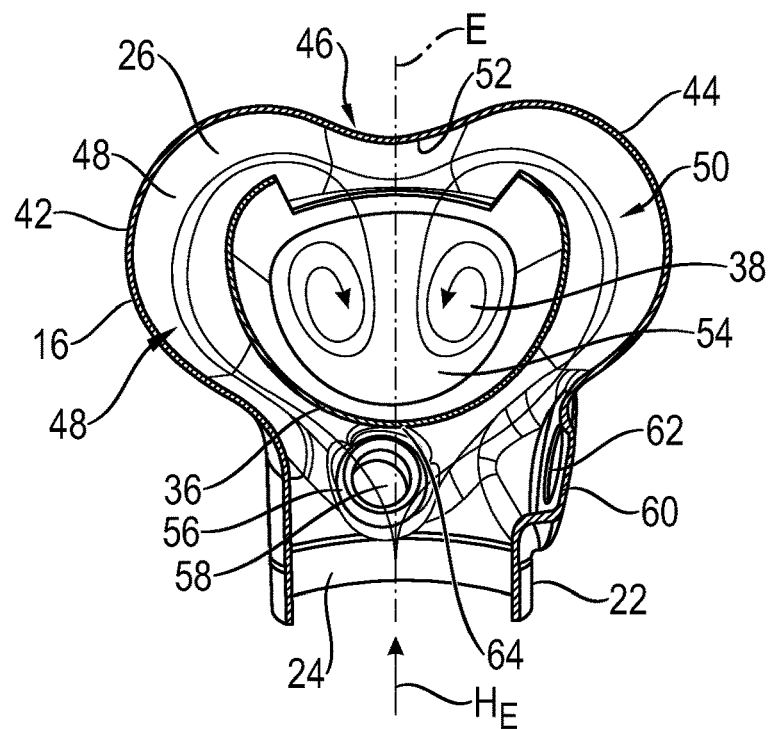
FIG. 3 is a side sectional view showing the mixer according to FIG. 2, cut along a line III-III in FIG. 2.

The first housing element 12 has an approximately heart-like shape in the cross section through the outer wall 16 shown in FIG. 3. For this, the mixer housing 40 has a first bulge area 42 especially in the area of the outer wall 16 and for this a second bulge area 44 mirror-symmetrical in relation to the plane E. These two bulge areas 42, 44 merge into one another in the area of an indentation area 46 at the area of the outer wall 16, which area is located opposite the inflow opening 24. The two end walls 18, 20 have an approximately heart-shaped outer circumferential contour adapted to this shape of the outer wall 16.

When viewing the mixer housing 40 from the outside, the bulge areas 42, 44 thus represent convex structures of the mixer housing 40, while the indentation area 46 is a concave structure of the mixer housing 40.

In the interior space 26, the inflow opening 24 is overlapped in the first housing element 12 by the flow divider wall 36 formed by the second length area 34 of the second housing element 14. The exhaust gas stream flowing into the interior space 26 in the direction of a main inlet direction HE via the inflow opening 24 impinges on the flow divider wall 36 and is essentially uniformly diverted by same in relation to the plane E on both sides. For this, it is advantageous if the second housing element 14 also has an essentially mirror-symmetrical configuration in relation to the plane E.

In conjunction with the first bulge area 42, the second housing element 14 with its flow divider wall 36 defines a first flow duct 48, which leads from the inflow opening 24 in an annular manner in the direction toward the indentation area 46. On the other side of the plane E, the flow divider wall 36 together with the second bulge area 44 defines a second flow duct 50, which leads from the inflow opening 24 to the indentation area 46. The two flow ducts 48, 50 are also essentially mirror-symmetrical especially because of the shape of the two housing parts 12, 14 in relation to the plane E, so that approximately equal partial flows of the exhaust gas stream introduced into the interior space 26 via the inflow opening 24 flow into the two flow ducts 48, 50.

The flow opening 32 provided in the second housing element 14 is positioned such that it is located opposite the indentation area 46. The indentation area 46 forms a flow deflection area 52, which, as suggested by flow lines, introduces the partial streams flowing into the two flow ducts 48, 50 into a third flow duct 54 formed in the interior of the second housing part 14. Since the two partial flows are deflected approximately uniformly by means of the flow deflection area 52 from both sides through the flow opening 32 into the third flow duct 54, two swirling flows which are approximately symmetrical or mirror-symmetrical to one another form in the halves of the third flow duct 54 formed on both sides of the plane E. The two swirling flows configured in this manner then guide the exhaust gas introduced into the third flow duct 54 further in the direction of the outflow opening central axis A through the first length area 30 of the second housing element 14, wherein the first length area 30 may also form a part of the third flow duct 54.

An injector mounting formation 56, which can be seen in FIGS. 2 and 3, is provided at the first housing element 12 in the area of the inflow opening 24. This injector mounting formation 56 may comprise an opening 58 formed in the first housing element 12, through which an injector, which is arranged on an outer side of the first housing element 12, for example, in an area of a mounting pipe to be provided there, can introduce the reactant into the exhaust gas stream.

FIG. 2 illustrates with the arrows A, B and C three possible positions of such an injector mounting formation 56 or of an injector, which is suggested by these arrows A, B, C as well. The injector mounting formation 56, which is shown in association with arrow C in the drawing, can be provided in each of these areas, wherein, for example, the position indicated by the arrow A corresponds to a position of the injector, in which this injector is positioned in the area of the upper end wall 18 and thus at a maximum distance from the outflow opening 38. The position of the injector mounting formation 56 corresponding to arrow B corresponds approximately to a central position between the two end walls 18, 20 on one side in relation to the inflow opening 24, while the position shown in FIGS. 2 and 3 and indicated by the arrow C indicates a position of the injector mounting formation 56 in the end wall 20 or close to the end wall 20 and thus close to the outflow opening 38 as well. Even though each of these positions is possible for the injector mounting formation 56, the positions shown by the arrows A and B are preferred because of the especially efficient mixing effect that can be achieved therewith.

FIG. 3 further shows that a sensor mounting formation 60 may be provided at the first housing element 12. This sensor mounting formation 60 may also comprise an opening 62, through which a sensor carried, for example, at a connecting piece fixed to the first housing element 12 in this area can mesh with the interior space 26 or can be positioned in interaction with same. Such a sensor may be, for example, a temperature sensor, a nitrogen oxide sensor or a lambda probe, i.e., a sensor, which provides information that is relevant for the operation of an exhaust system and, for example, can be used for the actuation of the injector or even the combustion operation in an internal combustion engine.

Figure 5:
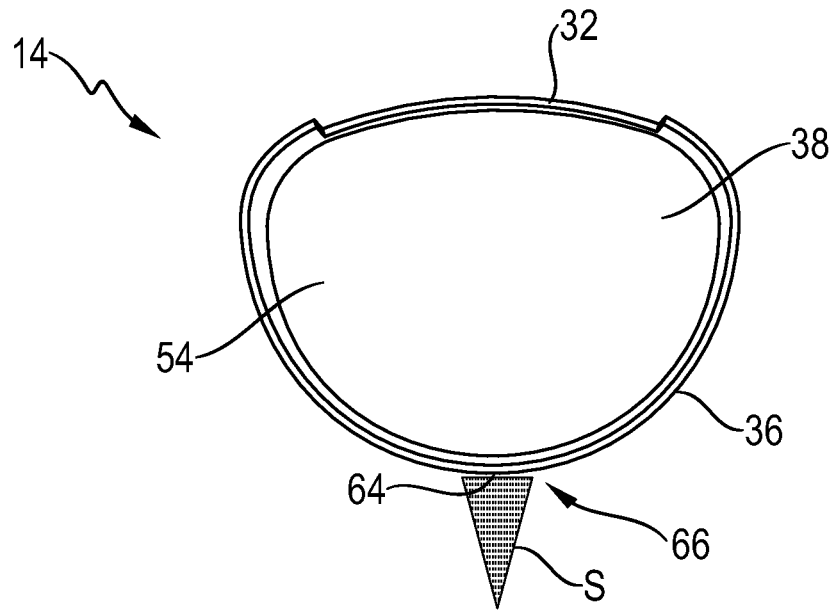
FIG. 5 is a top view of the housing element according to FIG. 4 in viewing direction V in FIG. 4.

FIG. 5 further illustrates that, for example, by positioning an injector in the manner described above or illustrated in FIGS. 1 and 2, the reactant stream released by the injector generally in the form of a spray cone S is directed toward an apex area 64 of the flow divider wall 36, which apex area 64 is facing the inflow opening 24. This apex area 64 of the flow divider wall, which is arched convexly in the upstream direction, i.e., in the direction toward the inflow opening 24, thus forms a reactant-receiving surface area 66, which the reactant stream or the spray cone S impinges. Thus, it can be guaranteed that almost all the reactant injected by the injector wets the surface of the flow divider wall 36 and is carried in the two flow ducts 48, 50 along the flow divider wall 36 and is evaporated here from the flow divider wall 36 and thus reaches the exhaust gas stream in the respective flow duct 48, 50.

The reactant injected upstream of the two flow ducts 48, 50, i.e., in the area of the inflow opening 24 and before dividing the two partial streams towards the apex area 64 is thus carried by these two partial streams through the two flow ducts 48, 50 and reaches the third flow duct 54 with the two partial streams in the form of the two swirling flows suggested in FIG. 3. These swirling flows lead to the development of such a swirling that an efficient mixing of the reactant, which is evaporated or partially carried along in droplet form, with the exhaust gas occurs. The mixture of reactant and exhaust gas generated in this manner then flows out through the third flow duct 54 or the second housing element 14 and the outflow opening 38 formed therein from the mixer 10 in the direction of a main outflow direction HA in the form of the swirling flows, which are then gradually mixed as well.

Figure 6:
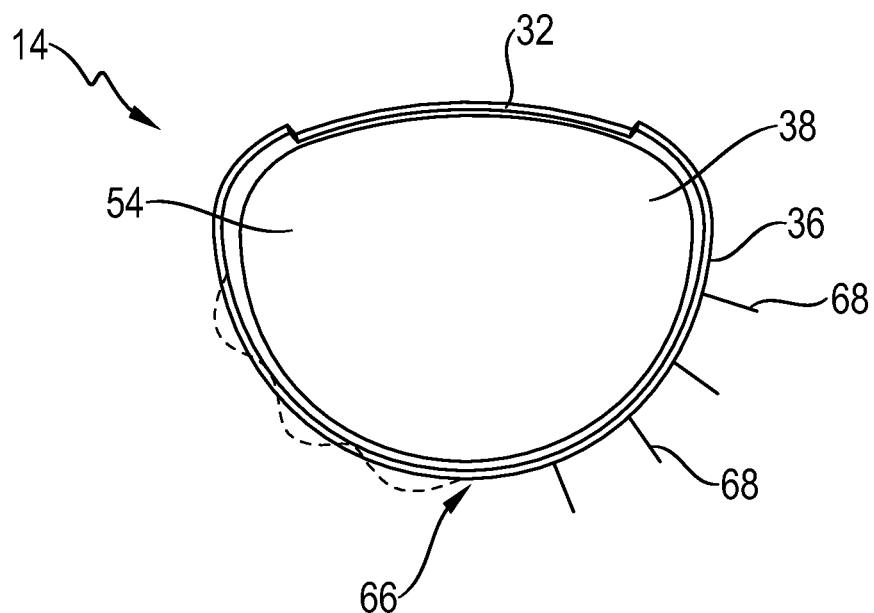
FIG. 6 is a top view, corresponding to FIG. 5, of the housing element according to FIG. 4 with alternative configurations of this housing element.

FIG. 6 shows alternatives to the structural configuration of the second housing element 14 which forms the flow divider wall 36. The left half of FIG. 6 thus shows, drawn in dashed line, that the flow divider wall 36 may have a wave-like configuration, for example, starting from the apex area 66, along its areas defining a respective flow duct 48 or 50 or/and upstream thereof. Such a wave-like structure leads to an enlargement of the surface of the flow divider wall 36 and thus supports the evaporation of the reactant wetting this surface. On the other hand, the wave-like structure progressing in the flow direction of a respective flow duct 48 or 50 already supports the formation of swirling and thus the mixing of reactant and exhaust gas in the flow ducts 48, 50.

In the right half of FIG. 6, a configuration is illustrated, in which a plurality of surface-enlarging elements 68 following one another in the flow direction and projecting from the flow divider wall 36 are provided. These surface-enlarging elements may be arranged, for example, such that they protrude approximately at right angles from the side of the flow divider wall 36, which side faces a respective flow duct 48 or 50, and essentially cover the entire extension area of the flow ducts 48, 50 in the direction of the outflow opening central axis LA. These surface-enlarging elements 68 also support the swirling of the exhaust gas stream in a respective flow duct 48, 50 or, depending on the position, already upstream of a respective flow duct 48, 50 and enlarge the surface of the second housing element 14, which surface is available for wetting with reactant and thus for evaporation of reactant.

It should be pointed out that the two alternatives shown in FIG. 6 may be provided in combination with one another, and that the surface-enlarging elements may have positions deviating from the extension direction shown, for example, can be set at an angle in or against the flow direction. In case of the flow divider wall being configured with a wave-like structure, this structure may have, for example, essentially the shape of a sinus wave. Other wave shapes, for example, a sawtooth wave shape or a triangular wave shape, may also be embodied.

The present invention provides a concept, which can be embodied in a structurally simple manner, of a mixer, which can bring about an efficient mixing of exhaust gas and reactant when using a low number of components that can be formed in a simple manner.

Finally, it should be noted that structural changes may, of course, be made in the mixer configured according to the present invention without deviating from the basic concept of the present invention, especially the dividing into partial flows to then be merged for generating respective swirling flows. It is thus possible to deviate from a precisely symmetrical configuration in relation to the plane E spanned by the two opening axes, for example, as FIG. 3 suggests this in connection with the injector mounting formation 56 shown there. This may concern both the configuration or position of the injector mounting formation and the configuration of the first or second flow duct. Due to such a shape deviating from a precisely symmetrical configuration, it is possible to compensate a nonuniform incoming flow to the flow divider wall 36. In another alternative configuration, the injector could also be arranged upstream in relation to the mixer housing, for example, at an exhaust gas pipe leading to the mixer housing.

While specific embodiments of the invention have been shown and described in detail to illustrate the application of the principles of the invention, it will be understood that the invention may be embodied otherwise without departing from such principles.

What is claimed is:

1. A mixer for an exhaust system of an internal combustion engine, the mixer comprising a mixer housing, the mixer housing comprising:

an outer wall with an inflow opening and with an outflow opening; and a flow divider wall enclosed by the outer wall, wherein:

the mixing housing has a first flow duct following the inflow opening in the mixer housing, a second flow duct and a third flow duct;

the first flow duct and the second flow duct provide parallel flow paths leading to the third flow duct and opening into same;

the third flow duct leads to the outflow opening;

the first flow duct and the second flow duct are provided between the outer wall of the mixer housing and the flow divider wall enclosed by the outer wall, and the third flow duct is enclosed by the flow divider wall;

the mixer housing defines the first flow duct with a first outward bulge area of the outer wall;

the mixer housing defines the second flow duct with a second outward bulge area of the outer wall;

the first outward bulge area and the second outward bulge area adjoin one another in an indentation area; and the indentation area forms a flow deflection area deflecting the exhaust gas streams from the first flow duct and from the second flow duct into the third flow duct.

2. The mixer in accordance with claim 1, wherein:

the flow divider wall has a flow opening; and the first flow duct opening and the second flow duct open into the third flow duct in an area of the flow opening in the flow divider wall.

3. The mixer in accordance with claim 1, wherein:

the flow divider wall has a flow opening;

the first flow duct opening and the second flow duct open into the third flow duct in an area of the flow opening in the flow divider wall; and the flow opening is located opposite the indentation area.

4. The mixer in accordance with claim 1, wherein:

the outer wall is formed by a first housing element;

the inflow opening is formed at the first housing element, the flow divider wall is formed by a second housing element, which is at least partially inserted into the first housing element; and the outflow opening is formed at the second housing element.

5. The mixer in accordance with claim 4, wherein:

the second housing element is elongated in a direction of an outflow opening central axis of the outflow opening;

the second housing element forms the outflow opening in a tubular first length area and is connected to the first mixer housing element and forms the flow divider wall in a second length area, or/and the second housing element forms a reactant receiving surface area with an apex area of the flow divider wall, which apex area faces the inflow opening.

6. The mixer in accordance with claim 1, wherein an inflow opening central axis of the inflow opening and an outflow opening central axis of the outflow opening are arranged not parallel and not coaxially to one another.

7. The mixer in accordance with claim 6, wherein:

the inflow opening central axis of the inflow opening and the outflow opening central axis of the outflow opening intersect each other; or the inflow opening central axis of the inflow opening and the outflow opening central axis of the outflow opening are arranged at an angle in the range of 80° to 100° to one another; or the inflow opening central axis of the inflow opening and the outflow opening central axis of the outflow opening intersect each other and are arranged at an angle in the range of 80° to 100° to one another.

8. The mixer in accordance with claim 1, wherein the first flow duct and the second flow duct have an essentially mirror-symmetrical configuration in relation to a central plane spanned by an inflow opening central axis of the inflow opening and by an outflow opening central axis of the outflow opening.

9. The mixer in accordance with claim 8, wherein the first housing element and the second housing element have an essentially mirror-symmetrical configuration in relation to the central plane spanned by the inflow opening central axis and by the outflow opening central axis.

10. The mixer in accordance with claim 1, wherein the outer wall of the mixer housing provides a heart-shaped circumferential contour comprised by the first outward bulge area, the second outward bulge area and the indentation area.

11. The mixer in accordance with claim 1, wherein:
    an injector mounting formation is provided in an area of the inflow opening; or
    a sensor mounting formation is provided in an area of the inflow opening; or
    an injector mounting formation and a sensor mounting formation are provided in an area of the inflow opening.

12. The mixer in accordance with claim 1, further comprising:
    a surface-enlarging element provided at the flow divider wall and protruding in front of or into the first flow duct;
    a surface-enlarging element provided at the flow divider wall and protruding in front of or into the second flow duct; and
    a surface-enlarging element provided at the flow divider wall and protruding in front of or into the first flow duct and a surface-enlarging element provided at the flow divider wall and protruding in front of or into the second flow duct.

13. The mixer in accordance with claim 1, wherein the flow divider wall has a wave-shaped configuration in at least some areas.

14. An exhaust system for an internal combustion engine, the exhaust system comprising:
    a mixer comprising a mixer housing, the mixer housing comprising an outer wall with an inflow opening and with an outflow opening; and a flow divider wall enclosed by the outer wall, wherein the mixing housing has a first flow duct following the inflow opening in the mixer housing, a second flow duct and a third flow duct, the first flow duct and the second flow duct provide parallel flow paths leading to the third flow duct and opening into same, the third flow duct leads to the outflow opening, the first flow duct and the second flow duct are provided between the outer wall of the mixer housing and the flow divider wall enclosed by the outer wall and the third flow duct is enclosed by the flow divider wall;
    an injector carried at the mixer housing or positioned upstream of the mixer housing;
    the mixer housing defines the first flow duct with a first outward bulge area of the outer wall;
    the mixer housing defines the second flow duct with a second outward bulge area of the outer wall;
    the first outward bulge area and the second outward bulge area adjoin one another in an indentation area; and
    the indentation area forms a flow deflection area deflecting the exhaust gas streams from the first flow duct and from the second flow duct into the third flow duct.

15. The exhaust system in accordance with claim 14, wherein the injector is carried at the mixer housing or upstream of the mixer housing such that a reactant stream released by this injector is directed toward a reactant-receiving surface area of the flow divider wall.

16. The exhaust system in accordance with claim 15, wherein:
    the flow divider wall has a flow opening; and
    the first flow duct opening and the second flow duct open into the third flow duct in an area of the flow opening in the flow divider wall.

* * * * *